(12) United States Patent
Nava Dueñas

(10) Patent No.: US 12,731,423 B2
(45) Date of Patent: *Sep. 8, 2026

(54) CIRCUIT BOARD PROCESSING SYSTEM USING FRAGMENTED SEARCH REGION IMAGE ANALYSIS

(71) Applicant: SKYWORKS SOLUTIONS, INC., Irvine, CA (US)

(72) Inventor: Carlos Fabian Nava Dueñas, Mexicali (MX)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 275 days.

This patent is subject to a terminal disclaimer.

(21) Appl. No.: 18/396,108

(22) Filed: Dec. 26, 2023

(65) Prior Publication Data

US 2024/0233428 A1 Jul. 11, 2024

Related U.S. Application Data

(60) Provisional application No. 63/438,276, filed on Jan. 11, 2023, provisional application No. 63/438,278, filed on Jan. 11, 2023.

(51) Int. Cl.
*G06V 30/18* (2022.01)
*G06T 5/94* (2024.01)
(Continued)

(52) U.S. Cl.
CPC .......... *G06V 30/18133* (2022.01); *G06T 5/94* (2024.01); *G06T 7/0004* (2013.01);
(Continued)

(58) Field of Classification Search
CPC ....... G06V 30/18133; G06V 30/19173; G06V 30/10; G06V 20/62; G06V 30/18086;
(Continued)

(56) References Cited

U.S. PATENT DOCUMENTS 4,490,852 A * 12/1984 Sahni .................. G06V 30/142 382/292
6,142,374 A * 11/2000 Matsuyama ......... G06V 30/155 235/455
(Continued)

FOREIGN PATENT DOCUMENTS

CN 109460735 A 3/2019
CN 209417762 U 9/2019
(Continued)

OTHER PUBLICATIONS

Combined Search and Examination Report from corresponding United Kingdom Application No. 2319582.9 dated May 15, 2024.
(Continued)

*Primary Examiner* — Santiago Garcia
(74) *Attorney, Agent, or Firm* — Lando & Anastasi, LLP

(57) ABSTRACT

A circuit board processing system configured to process a panel, the system comprising a character recognition system configured to obtain a digital image of a character imprinted on a surface of the panel. The character recognition system is further configured to apply a fragmented search region to the digital image to obtain less than a whole of the character and apply image analysis to the less than a whole of the character; and to classify the character based on the image analysis.

16 Claims, 7 Drawing Sheets

(51) Int. Cl.
*G06T 7/00* (2017.01)
*G06V 30/19* (2022.01)

(52) U.S. Cl.
CPC ...... *G06T 7/0008* (2013.01); *G06V 30/19173* (2022.01); *G06T 2207/30141* (2013.01)

(58) Field of Classification Search
CPC ............. G06V 30/1908; G06V 30/147; G06V 30/19013; G06V 30/224; G06T 5/94; G06T 7/0004; G06T 7/0008; G06T 2207/30141; H01L 23/544; H01L 2223/54406; H01L 2223/54413; H03F 3/45
See application file for complete search history.

(56) References Cited

U.S. PATENT DOCUMENTS 8,620,078 B1 * 12/2013 Chapleau ............. G06V 30/153 382/173
9,008,431 B2 4/2015 Goto et al.
9,355,444 B2 5/2016 Nava et al.
2005/0235491 A1 10/2005 Macnutt et al.
2015/0144690 A1 * 5/2015 Song .................. G06K 7/10871 235/375
2015/0193667 A1 7/2015 Acharya et al.
2016/0004672 A1 * 1/2016 Sakunkoo ............... H04L 51/08 715/269
2020/0311457 A1 * 10/2020 Park ..................... G06N 3/0464
2023/0094297 A1 * 3/2023 Liu ........................ G06V 30/16 382/255
2024/0077862 A1 * 3/2024 Burke .................. H05K 13/083
2024/0233423 A1 7/2024 Nava Dueñas
2024/0395062 A1 * 11/2024 Matsumoto ............... G06T 5/50

FOREIGN PATENT DOCUMENTS

CN 110909735 A 3/2020
CN 112163508 A 1/2021
CN 114219946 B 11/2022
KR 101635738 B1 7/2016
KR 20210103597 A 8/2021

OTHER PUBLICATIONS

Search Report from corresponding United Kingdom Application No. 2502473.8 dated Mar. 25, 2025.

* cited by examiner

CIRCUIT BOARD PROCESSING SYSTEM USING FRAGMENTED SEARCH REGION IMAGE ANALYSIS

CROSS-REFERENCE TO RELATED APPLICATIONS

This application claims priority under 35 U.S.C. § 119(e) to U.S. Provisional Patent Application Ser. No. 63/438,278, titled "A CIRCUIT BOARD PROCESSING SYSTEM USING FRAGMENTED SEARCH REGION IMAGE ANALYSIS," filed Jan. 11, 2023, and to U.S. Provisional Patent Application Ser. No. 63/438,276, titled "A CIRCUIT BOARD PROCESSING SYSTEM USING LOCAL THRESHOLD VALUE IMAGE ANALYSIS," filed Jan. 11, 2023, the entire contents of which are incorporated herein by reference for all purposes.

BACKGROUND

Field

Embodiments of the present disclosure relate to a circuit board processing system. In particular, embodiments of the present disclosure relate to a circuit board processing system configured to process a panel, and a corresponding packaged module processing system and method for fabricating packaged modules.

Description of the Related Technology

In electronics applications, packaged modules are manufactured in a number of fabrication process steps. Such process steps can include imprinting of characters to provide, for example, identification of the packaged modules during various stages of the process steps.

Fabricating packaged modules, such as power amplifiers, can be challenging. Many variables can lead to the production of defective modules. For instance, impurities may unintentionally be introduced during different stages of production by, for example, the fabrication environment or the operators of the fabrication and/or packaging machines. Further, scratches or other damage may occur from drops, bumps, vibrations, etc. during fabrication and/or packaging of the modules.

In addition to the monetary loss caused by the loss of revenue from defective modules, manufacturers expend resources, both monetary and personnel, to identify and remove from the production lines the defective modules. Further, interrupting production to identify and remove defective modules can reduce a manufacturer's yield leading to additional losses.

Molding flashing is excess plastic that forms on the surface of injection molded parts and can cause damage to identifiers or characters on a panel or circuit board preventing identification of a particular module.

SUMMARY

According to one embodiment, there is provided a circuit board processing system configured to process a panel, the system comprising a character recognition system configured to obtain a digital image of a character imprinted on a surface of the panel, the character recognition system being further configured to: perform image analysis on the digital image of the character, the image analysis including applying a local threshold value to one or more localities of the digital image to provide a binarized image of the character; and classify the character based on the image analysis, the local threshold value applied to each locality of the one or more localities being based on pixel information around each respective locality.

In one example, the image analysis further comprises, after applying the local threshold values, applying contrast equalization to the digital image of the character.

In one example, the character recognition system is further configured to apply a fragmented search region to the digital image to obtain less than a whole of the character and apply the image analysis to the less than a whole of the character.

In one example, the character recognition system is further configured to determine the fragmented search region based on analysis of damage to the character.

In one example, if the character cannot successfully be classified based on the image analysis, the character recognition system is further configured to apply a global threshold value to the binarized digital image to provide a second binarized digital image of the character.

In one example, the character recognition system is further configured to iteratively apply global threshold values to provide a series of binarized digital images of the character, each iteration having a different global threshold value, until the character can be successfully classified.

In one example, the pixel information comprises one or more pixel intensity values of neighboring pixels to a pixel of each respective locality.

In one example, the image analysis comprises applying local threshold values to a plurality of localities of the digital image to provide a binarized image of the entire character.

In one example, the panel comprises an array of units that are joined together, each unit having a surface, the panel including a surface outside of the array of units.

In one example, the character is imprinted on the surface of each unit.

According to another embodiment, there is provided a packaged module processing system comprising: a circuit board processing system configured to process a panel having an array of units that are joined together, each unit having a surface, the panel including a surface outside of the array of units; a module processing system configured to produce a number of packaged modules from the array of units, such that each packaged module includes a surface; and a character recognition system configured to obtain a digital image of a character imprinted on a surface of the panel, the character recognition system being further configured to: perform image analysis on the digital image of the character, the image analysis including applying a local threshold value to one or more localities of the digital image to provide a binarized image of the character; and classify the character based on the image analysis, the local threshold value applied to each locality of the one or more localities being based on pixel information around each respective locality.

According to another embodiment, there is provided a method for fabricating packaged modules, the method comprising: forming or providing a panel having an array of units that are joined together, each unit including a surface, the panel including a surface outside of the array of units; producing a number of packaged modules from the array of units from the array of units, such that each packaged module includes a surface; and performing a character recognition process to obtain a digital image of a character imprinted on each of some or all of the surface of the panel, the surface of each unit, and the surface of each packaged module, the character recognition process including performing image analysis including applying a local threshold value to one or more localities of the digital image to provide a binarized image of the character; and classifying the character based on the image analysis, the local threshold value applied to each locality of the one or more localities being based on pixel information around each respective locality.

In one example, performing the image analysis further comprises, after applying the local threshold values, applying contrast equalization to the digital image of the character.

In one example, performing the character recognition process further comprises applying a fragmented search region to the digital image to obtain less than a whole of the character and applying the image analysis to the less than a whole of the character.

In one example, performing the character recognition process further comprises determining the fragmented search region based on analysis of damage to the character.

In one example, if the character cannot successfully be classified based on the image analysis, the character recognition process further comprises applying a global threshold value to the digital image to provide a second binarized digital image of the character.

In one example, the character recognition process further comprises iteratively applying global threshold values to provide a series of binarized digital images of the character, each iteration having a different global threshold value, until the character can be successfully classified.

In one example, the pixel information comprises one or more pixel intensity values of neighboring pixels to a pixel of each respective locality.

In one example, the character recognition process further comprises applying local threshold values to a plurality of localities of the digital image to provide a binarized image of the entire character.

In one example, the character is imprinted on the surface of each unit.

According to another embodiment, there is provided a circuit board processing system configured to process a panel, the system comprising a character recognition system configured to obtain a digital image of a character imprinted on a surface of the panel, the character recognition system being further configured to: apply a fragmented search region to the digital image to obtain less than a whole of the character and apply image analysis to the less than a whole of the character; and classify the character based on the image analysis.

In one example, the character recognition system is further configured to determine the fragmented search region based on analysis of damage to the character.

In one example, the character recognition system is configured to determine the fragmented search region to exclude at least some damage to the character based on the analysis of damage to the character.

In one example, the image analysis comprises applying a local threshold value to one or more localities of the digital image to provide a binarized image of the character, the local threshold value applied to each locality of the one or more localities being based on pixel information around each respective locality.

In one example, the pixel information comprises one or more pixel intensity values of neighboring pixels to a pixel of each respective locality.

In one example, the image analysis further comprises, after applying the local threshold values, applying contrast equalization to the digital image of the character.

In one example, if the character cannot successfully be classified based on the image analysis, the character recognition system is further configured to apply a global threshold value to the binarized digital image to provide a binarized digital image of the character.

In one example, the character recognition system is further configured to iteratively apply global threshold values to provide a series of binarized digital images of the character, each iteration having a different global threshold value, until the character can be successfully classified.

In one example, the image analysis comprises applying local threshold values to a plurality of localities of the digital image to provide a binarized image of the entire character.

In one example, the panel comprises an array of units that are joined together, each unit having a surface, the panel including a surface outside of the array of units.

In one example, the character is imprinted on the surface of each unit.

According to another embodiment, there is provided a packaged module processing system comprising: a circuit board processing system configured to process a panel having an array of units that are joined together, each unit having a surface, the panel including a surface outside of the array of units; a module processing system configured to produce a number of packaged modules from the array of units, such that each packaged module includes a surface; and a character recognition system configured to obtain a digital image of a character imprinted on a surface of the panel, the character recognition system being further configured to: apply a fragmented search region to the digital image to obtain less than a whole of the character and apply image analysis to the less than a whole of the character; and classify the character based on the image analysis.

According to another embodiment, there is provided a method for fabricating packaged modules, the method comprising: forming or providing a panel having an array of units that are joined together, each unit including a surface, the panel including a surface outside of the array of units; producing a number of packaged modules from the array of units from the array of units, such that each packaged module includes a surface; and performing a character recognition process to obtain a digital image of a character imprinted on each of some or all of the surface of the panel, the surface of each unit, and the surface of each packaged module, the character recognition process including applying a fragmented search region to the digital image to obtain less than a whole of the character and applying image analysis to the less than a whole of the character; and classifying the character based on the image analysis.

In one example, the performing the character recognition process comprises determining the fragmented search region based on analysis of damage to the character.

In one example, the performing the character recognition process comprises determining the fragmented search region to exclude at least some damage to the character based on the analysis of damage to the character.

In one example, the image analysis includes applying a local threshold value to one or more localities of the digital image to provide a binarized image of the character, the local threshold value applied to each locality of the one or more localities being based on pixel information around each respective locality.

In one example, the pixel information comprises one or more pixel intensity values of neighboring pixels to a pixel of each respective locality.

In one example, the image analysis further comprises, after applying the local threshold values, applying contrast equalization to the digital image of the character.

In one example, if the character cannot successfully be classified based on the image analysis, the character recognition system is further configured to apply a global threshold value to the binarized digital image to provide a binarized digital image of the character.

In one example, the character recognition system is further configured to iteratively apply global threshold values to provide a series of binarized digital images of the character, each iteration having a different global threshold value, until the character can be successfully classified.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Described herein are various examples of systems, apparatus, devices structures, materials and/or methods related to processing circuit boards and in particular, reading identifiers or characters printed on circuit boards, and fabrication of packaged modules, which may include a radio-frequency (RF) circuit and wirebond-based electromagnetic (EM) isolation structures. Although described in the context of RF circuits, one or more features described herein can also be utilized in packaging applications involving non-RF components. Similarly, one or more features described herein can also be utilized in packaging applications without the EM isolation functionality.

Figure 1:
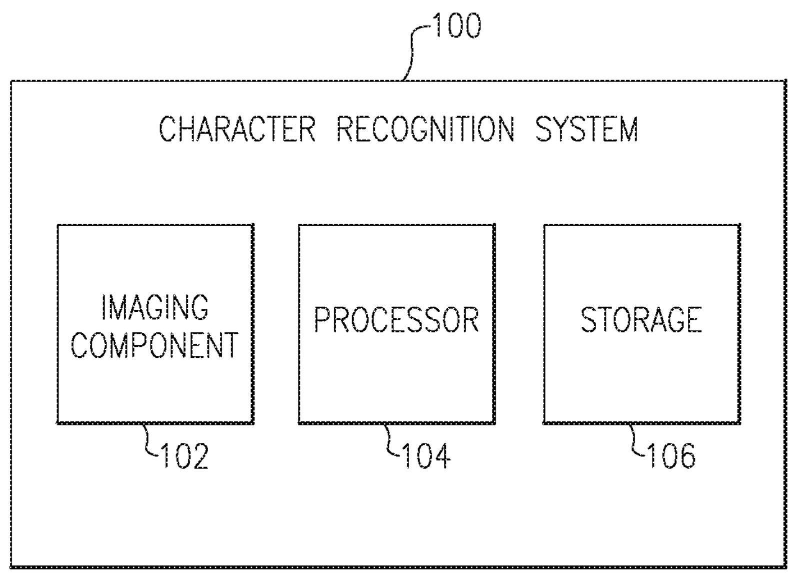
FIG. 1 is a schematic diagram of a character recognition system according to aspects of the present invention.

FIG. 1 depicts a character recognition system 100 that can be configured to provide one or more features as described herein. In some embodiments, such a system can include an imaging component 102 or camera system for obtaining an image of an object being processed (e.g., a printed circuit board (PCB) and/or a packaged module). Such an imaging component can include, for example, an imaging sensor and optics for forming an image of the object on the imaging sensor. The imaging component 102 can include any type and number of imaging devices that can be used to obtain or capture an image of a PCB provided to the character recognition system 100. For example, the imaging component 102 may include digital cameras, optical cameras, thermal cameras, infrared cameras, etc. Further, the imaging component 102 may include one, two, three, four, or more cameras. In some cases, the number of cameras may be dependent on the type of PCB or the organization of individual module substrates on the PCB.

As shown in FIG. 1, the character recognition system 100 can further include a processor 104 configured to process the image obtained from the imaging sensor. The processor 104 can also be configured to provide functionalities associated with one or more features as described herein.

As shown in FIG. 1, the character recognition system 100 can further include a storage component 106 configured to provide storage functionality. In some embodiments, such a storage component can provide non-volatile storage of, for example, the image, and information associated with the processing of the image. The storage component 106 can also be configured to provide non-volatile storage of algorithms, data, lookup tables, etc. that can be utilized to facilitate operation of the enhanced character recognition system 100.

Figure 2:
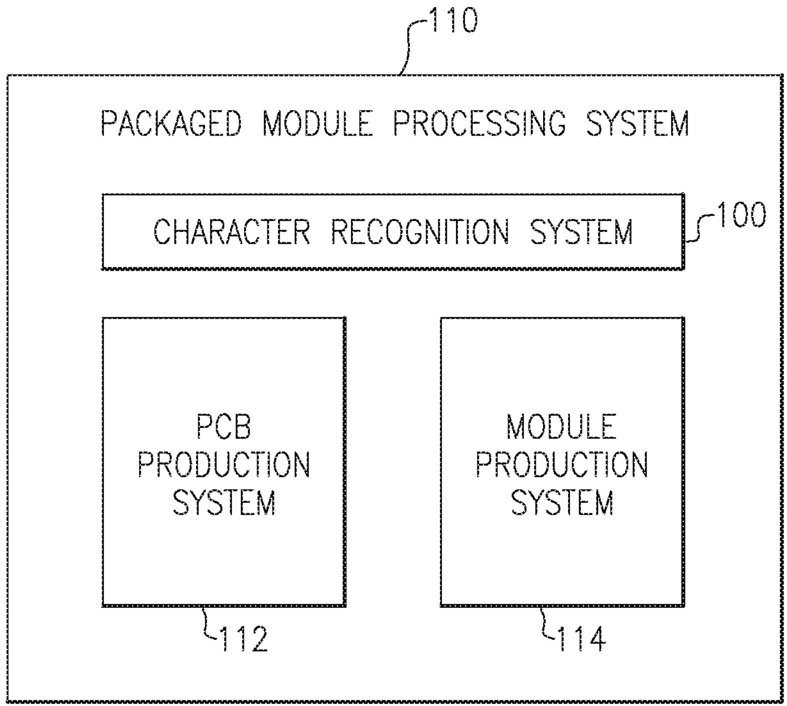
FIG. 2 is a schematic diagram of a packaged module processing system including the character recognition system of FIG. 1 according to aspects of the present invention.

FIG. 2 shows that in some embodiments, the character recognition system 100 of FIG. 1 can be utilized in a manufacturing system such as a packaged module processing system 110. Such a packaged module processing system can include a PCB processing/production system 112 configured to fabricate and/or process, for example, panels with each panel having an array of partially or fully completed modules that are joined together. Such a panel can be singulated to produce a number of individual packaged modules. In some embodiments, such singulated packaged modules can be substantially complete, or be processed further. Handling and/or further processing of the packaged modules can be achieved by a module processing/production system 114. Among others, examples related to production of such packaged modules are described in U.S. Pat. No. 9,355,444 titled SYSTEMS AND METHODS FOR PROCESSING PACKAGED RADIO-FREQUENCY MODULES IDENTIFIED AS BEING POTENTIALLY DEFECTIVE which is expressly incorporated by reference in its entirety, and its disclosure is to be considered part of the specification of the present application.

In some embodiments, the character recognition system 100 of FIG. 2 can be utilized to perform character recognition in the PCB processing/production system 112, and/or in the module processing/production system 114.

Figure 3:
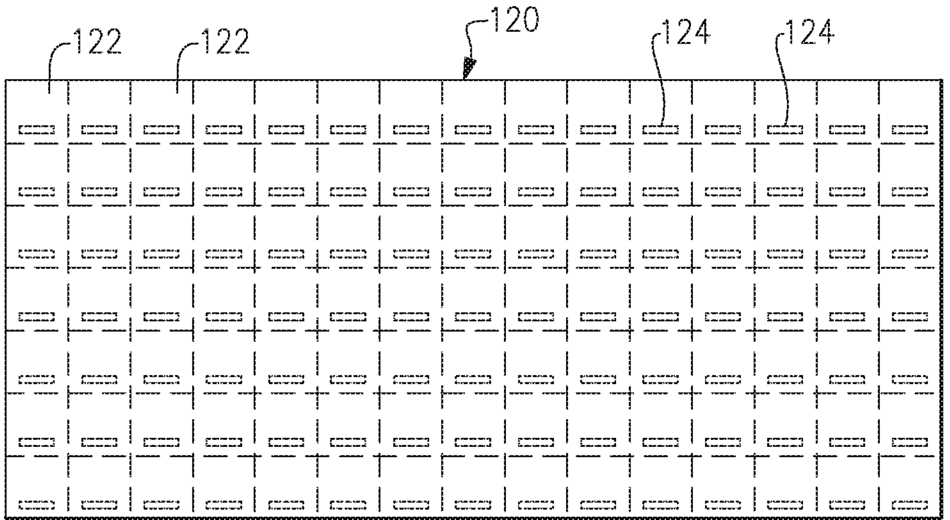
FIG. 3 is a schematic diagram of an array of units in a panel format undergoing a fabrication process to manufacture multiple packaged modules according to aspects of the present disclosure.

For example, FIG. 3 shows a panel 120 having an array of units 122 that will become individual units when singulated. In some embodiments, each of such units (122) can include a set of characters 124 imprinted on, for example, a surface of its respective packaging substrate, a surface of a component mounted thereon, and/or a surface of an overmold structure (e.g., if an overmold is formed prior to singulation). In some embodiments, the character recognition system 100 of FIG. 2 can be configured to perform character recognition for such sets of characters (124). It will be understood that in some embodiments, the character recognition system 100 of FIG. 2 can additionally or alternatively be configured to perform character recognition on a set of characters imprinted on a surface of the panel 120 but not on each unit (122).

Figure 4:
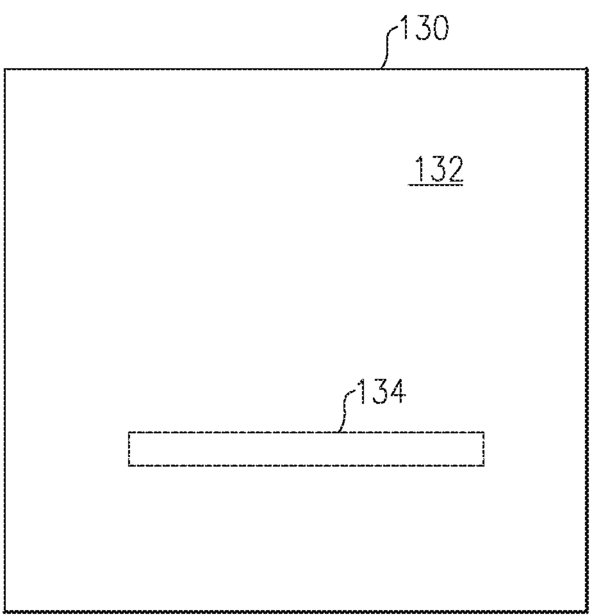
FIG. 4 is a schematic diagram of an individual packaged module according to aspects of the present disclosure.

In another example, FIG. 4 shows an individual unit 130 resulting from, for example, singulation of an array of units of a panel. In some embodiments, such an individual unit (130) can include a surface 132 with a set of characters 134 imprinted thereon. Such a surface (132) of the individual unit 130 can be, for example, an upper surface of an overmold structure, an underside of a packaging substrate, or a surface of a shielding layer (e.g., a conformal shielding coating formed on an upper surface of an overmold structure of an individual unit 130). In some embodiments, the character recognition 100 of FIG. 2 can be configured to perform character recognition for such a set of characters (134). It will be understood that the individual unit 130 can be a final form of a packaged module or a packaged module to be processed further. Such packaged modules can be any electronic modules, including modules associated with wireless applications.

In some embodiments, a character recognition system 100 of FIGS. 1 and 2 can be configured to provide optical character recognition as described herein, including various examples described herein with reference to FIGS. 5 to 11*b*.

Computer vision technologies and image processing techniques are important in the improvement and automation of manual processes in many technical areas such as the semiconductor industry. Disclosed are examples related to image processing methods implemented to have optical character recognition (OCR) by use of a principal component analysis method to extract principal characteristics and features of damaged or unreadable characters such as numerical digits from images on objects such as printed board circuits (PCBs).

Optical character recognition has been an important technology used to convert characters from a digital image to a digital text. There are basically two types of OCR algorithms. The first technique is related with matching of matrix images, where an alphabet of stored character images is used to compare with an input image. This pattern matching does not work well when new fonts are encountered or input character images are unreadable. The second technique decomposes an input image to extract principal features. Then, classifiers are used to compare the input image features with some stored image features and choose the best match.

For the purpose of description, a system that uses the traditional OCR technique with pattern matching is referred to as a conventional or current system. In such a system, a vision system reads identification characters on printed circuits boards (PCBs) for lot integrity and machine control. In some applications, this commonly used technique is not robust enough because many of the images of PCBs include some damage on the characters due to, for example, dirt or the results of bad previous processes. For such a system, actual OCR detectability is around 97% at best.

Figure 5:
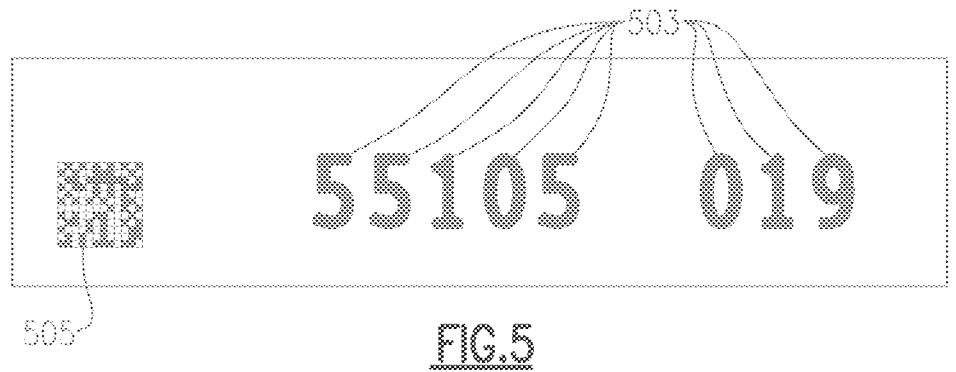
FIG. 5 is an example of a digital image of characters on a circuit board in which the characters are undamaged.

In an example of the foregoing system, one can start with a monochrome VGA image acquisition of the upper left section of a PCB, using a NI-1752 smart camera, with a full resolution of 640×480 pixels with a maximum data transfer of 60 fps using a GigE port. The selected resolution and data transfer speed parameters can be selected to meet the factory production schedule of inspected PCBs. The camera has a grayscale output image type with a maximum character resolution to cover the entire PCB characters positions, as shown in FIG. 5. Characters include numerical digits 503 and an identifier which here is a QR code 505.

Figure 6:
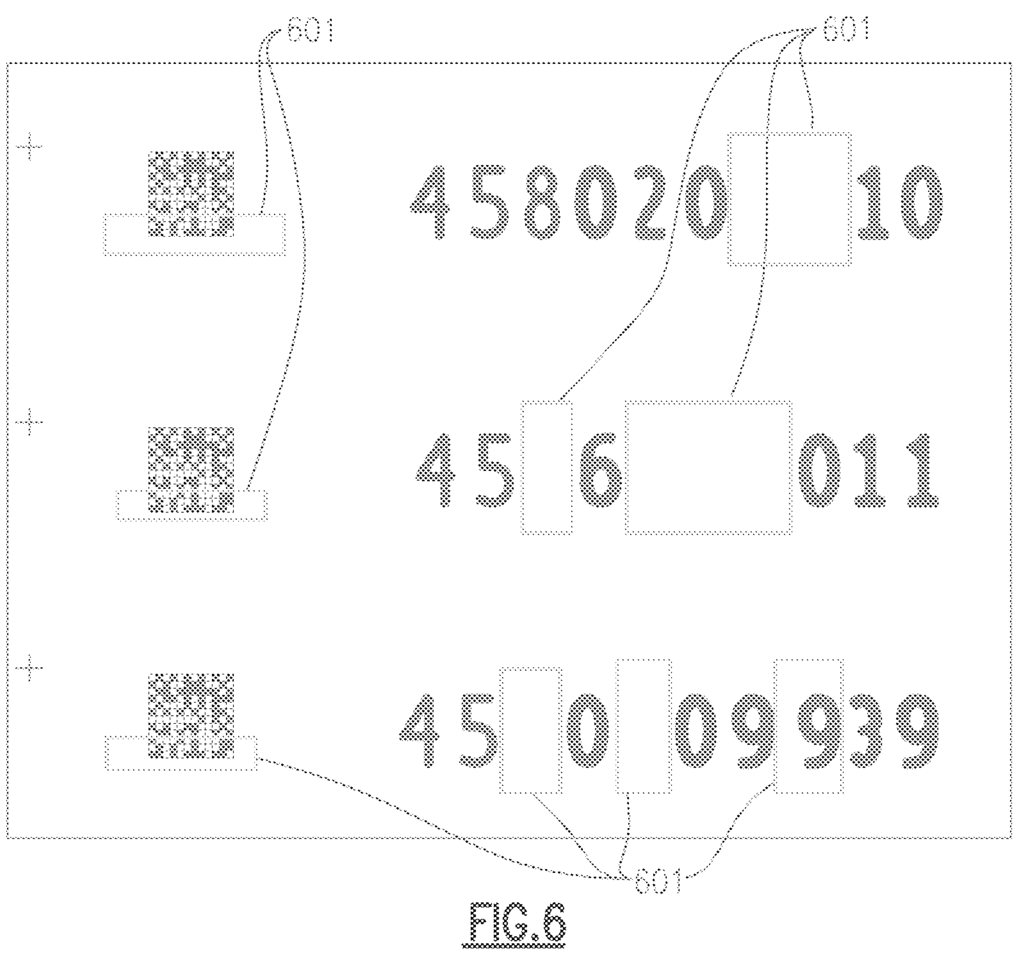
FIG. 6 is an example of a digital image of characters on a circuit board in which some characters are damaged.

As mentioned above, due to problems with previous processes in the production line, some PCBs present damage or adversely affected portions due to, for example, molding flashing or residual dirt over the characters, making some characters unreadable for the pattern matching technique, as shown in FIG. 6, with damaged portions 601 highlighted. Accordingly, an operator having to inspect and manually writing down the information from a screen when the actual recognition algorithm fails, results in, for example, a reduced throughput, increase in process time, possible human errors, and higher production costs.

Aspects and embodiments described herein are directed to a circuit board processing system and method for providing optical character recognition of damaged or unreadable characters on a panel with high speed. In existing systems, when an excess of molding flashing and bad brightness distribution is present, image processing using pattern matching takes significant time to read characters on a circuit board using OCR, for example by using an iterative global threshold loop in which different global threshold values are used in each iteration to binarize the digital image and ultimately successfully classify a character in the digital image.

According to some embodiments described herein, local threshold values are applied to a character in a digital image for background analysis of one or more pixels, such as all pixels, surrounding one pixel in the character. If the character can be classified or read (for example, with OCR), the process is successful and can be stopped. The time taken to read the characters using OCR is significantly reduced compared to existing arrangements when classified or read following the application of the local threshold value. For example, a typical process applying an iterative global threshold loop for OCR may take approximately 7 seconds to recognize all characters. However, embodiments described herein may reduce this time significantly to the order of hundreds of milliseconds, such as 200 ms, providing approximately a 97% reduction in processing time.

However, if the character cannot be classified or read, for example due to significant damage from molding flashing, one or more global threshold values may be applied. These values may be applied in an iterative process, applying a different global threshold value to the digital image with each iteration. Iterations of global threshold values may be applied until the character can be successfully classified or read.

Binarization is a process of separation of pixel values of an input image into two pixel values such as background (in white) and foreground (in black). An input image, e.g., a multi-valent image in the form of a color or grayscale image, may be represented by a set of pixel values where the different pixel values may cover a wide range, e.g. 256 possible values. Threshold binarization separates pixel intensity values above and below a given threshold in order to binarize the pixels and thus the image.

Global thresholding includes applying a single threshold value for an entire input image, and each pixel is assigned to background or foreground based on the global threshold. However, when brightness distribution is not consistent across an image, global thresholding can be less effective and noise may be introduced. As will be described in more detail below, local thresholding may instead be used which applies different thresholds for different pixels in the image based on pixel information of neighboring pixels.

Figure 7:
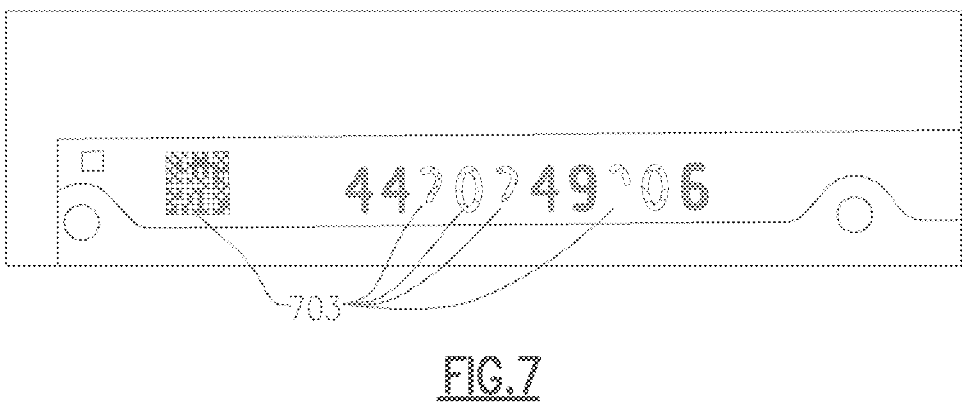
FIG. 7 is an example of a digital image of characters on a circuit board in which some characters are damaged.
Figure 8:
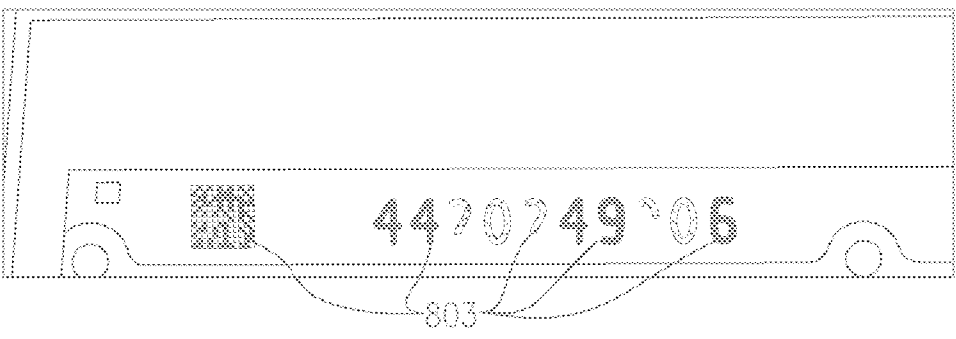
FIG. 8 is an example of a digital image of characters on a circuit board in which some characters are damaged.

FIGS. 7 and 8 illustrate digital images of characters on a panel of a circuit board. The characters include individual numerical digits and identifiers such as QR codes or barcodes. Both FIGS. 7 and 8 illustrate physical damage 703, 803 to characters in the image, with FIG. 8 illustrating more extensive damage 803 arising, in this example, from molding flashing (for clarity of illustration, not all instances of damage are labelled with reference numerals). Significantly, in both illustrated examples, an application of OCR is unsuccessful in classifying the characters and therefore cannot correctly identify the particular circuit board or module.

As will be described with reference to FIGS. 9A to 11B, embodiments of the present disclosure described herein may be utilized in order to be able to successfully classify the characters printed on the surface of the panel.

Figure 9A:
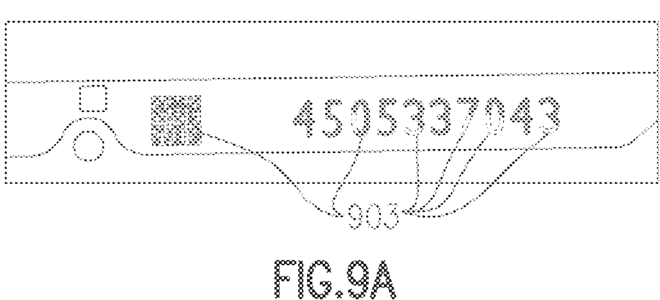
FIG. 9A is an example of a digital image of characters on a circuit board to be processed by the circuit board processing system according to aspects of the present disclosure.
Figure 9B:
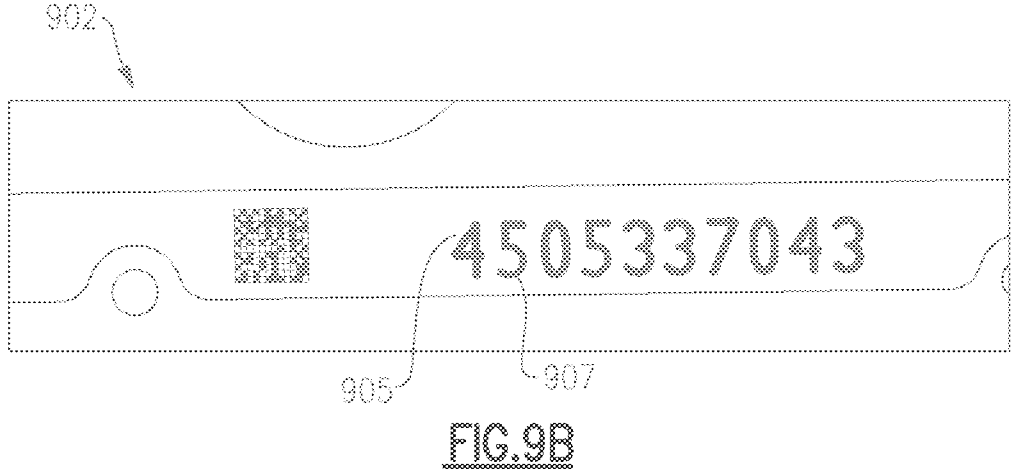
FIG. 9B is a binarized digital image having been processed using local threshold values by the circuit board processing system according to aspects of the present disclosure.
Figure 9C:
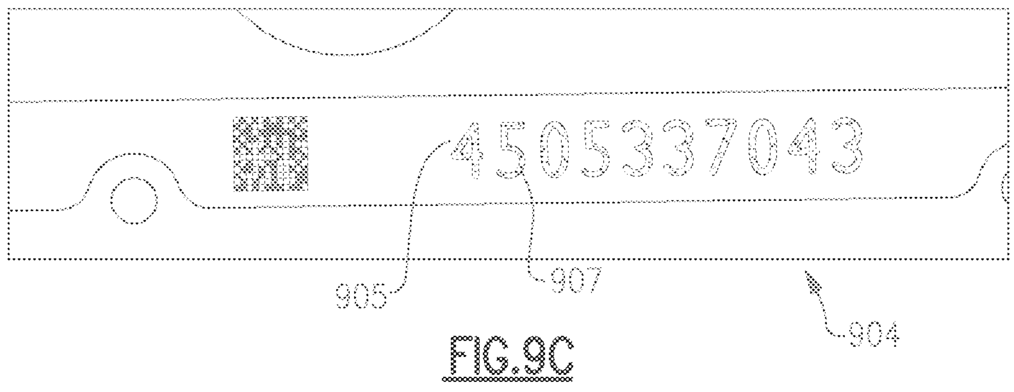
FIG. 9C is a binarized digital image having been processed using local threshold values by the circuit board processing system according to aspects of the present disclosure.

FIG. 9A to 9C illustrate digital images of characters on a panel of a circuit board, with FIGS. 9B and 9C having received varying degrees of image processing according to embodiments described herein.

In more detail, FIG. 9A illustrates a digital image of characters on a panel of a circuit board having received no image processing. Similarly to FIGS. 7 and 8, the characters printed on the surface of the panel have been damaged 903, in this example, by molding flashing and cannot be read using OCR in the present state of the image. Image processing according to one or more embodiments described herein is therefore be applied in order to successfully classify the characters.

FIG. 9B illustrates a digital image of the same characters having received image processing according to some embodiments described herein. In this example, a character recognition system obtains the digital image of the characters imprinted on the surface of the panel. The character recognition system then performs image analysis of the digital image of the character or characters. The image analysis includes applying a local threshold value to one or more localities of the digital image in order to provide a binarized image 902 of the characters. This enables the character recognition system to classify each character using OCR and thus read all of the characters to identify the particular circuit board.

The local threshold value applied to each locality is based on pixel information around each respective locality. That is, the character recognition system identifies a particular pixel of a character and applies a threshold to the pixel and its surrounding pixels. Based on pixel intensity values, the threshold applied determines whether each of the pixel and neighboring pixels is considered a background 905 or foreground 907 pixel and binarizes the pixels accordingly. For example, a pixel having an intensity value above a particular threshold may be determined to be a foreground pixel and a pixel having an intensity value below the threshold may be determined to be a background pixel, or vice versa. Applying local threshold values similarly to a plurality of locations in the image allows the entire digital image to be binarized, or at least the region of the image containing the characters. Once the image is successfully binarized, OCR can be applied to the binarized image to classify the characters. Classification may be performed using pattern matching.

If, having applied local threshold values to the plurality of localities of the digital image and providing a binarized image, the characters cannot be successfully classified, the character recognition system may apply a global threshold value to the binarized digital image to provide a second or further binarized digital image of the characters. The character recognition system may further be configured to iteratively apply global threshold values to provide a series of binarized digital images, each iteration being performed on the image provided by the previous iteration, and each iteration having a different global threshold value applied. This iterative process may be continued until the characters may be successfully classified. That is, OCR may be attempted after each iteration until the characters can be successfully classified. Successful classification may be made after one iteration, or a plurality of iterations.

The image analysis applied by the character recognition system may additionally include applying contrast equalization to the digital image, or to the binarized digital image, or the characters. FIG. 9C illustrates the binarized digital image 902 of FIG. 9B, having received application of contrast equalization to provide a binarized digital image 904 with contrast equalization. Contrast equalization, or histogram equalization, better distributes intensities on the image's histogram utilizing the full range of intensities evenly which allows for areas of lower local contrast to gain a higher contrast. This further distinguishes the characters from the background and enables the OCR to better classify the characters.

In some embodiments described herein, the character recognition system is configured to apply a fragmented search region or fragmented search box to the digital image to obtain less than a whole of the character and apply image analysis to the less than a whole of the character. This fragmented search region may be applied in addition to, or alternatively to, the image processing described including application of local threshold values in order to classify the characters imprinted on the surface of the panel. FIGS. 10A to 10D illustrate application of the fragmented search box.

Figure 10A:
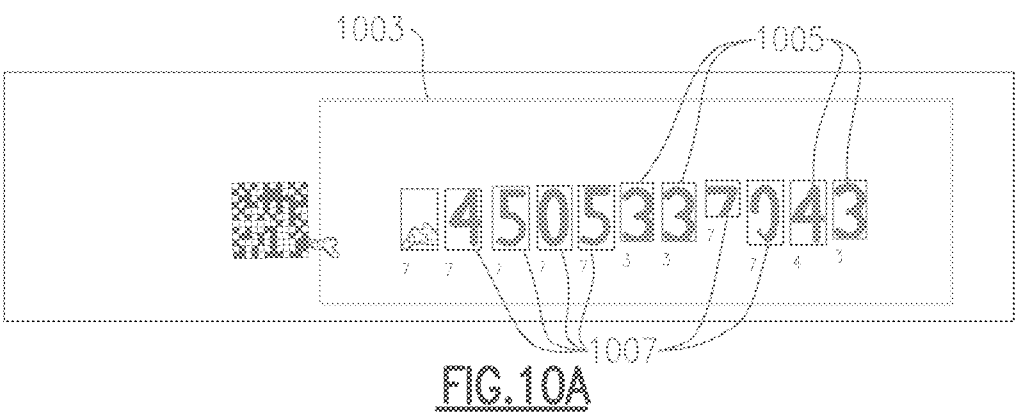
FIG. 10A is a binarized digital image having been processed by the circuit board processing system according to aspects of the present disclosure.

FIG. 10A illustrates a digital image including a search region or search box 1003 to which image analysis may be applied by the character recognition system. In particular, the region has been binarized according to methods described herein. The search box 1003 encompasses the entirety of the numerical characters to be read using OCR, but the OCR is unable to successfully classify all of the characters. The search box 1003 therefore includes successfully classified characters 1005 and unsuccessfully classified characters 1007.

Figure 10B:
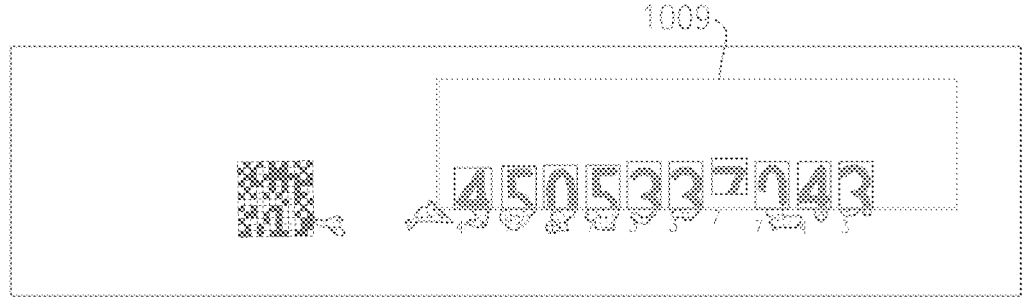
FIG. 10B is a binarized digital image having been processed using a fragmented search region by the circuit board processing system according to aspects of the present disclosure.

In order to successfully classify more, or all, of the characters, the character recognition system determines and applies a fragmented search region 1009 illustrated in FIG. 10B.

The fragmented search region 1009 is used to narrow the image analysis of a digital image of a character to a portion less affected or unaffected by molding flashing and/or bad brightness. That is, a sub-portion of the digital image of the character may be analyzed in order to read the character using OCR. If the character is affected by molding flashing and/or bad brightness, a fragmented portion or fragmented search region 1009 encompassing less than a whole of the character may be analyzed. In this way, damaged or adversely affected portions of the character may be cut off from analysis and the character may still be read using the fragmented search box.

The fragmented search region 1009, or partial search region, may be determined based on analysis of damage to the character or characters. For example, the character recognition system is configured to determine location and severity of damage to each character of the characters. The fragmented search box may then be determined based on the analysis such that at least some of the damaged regions of the characters are excluded from the fragmented search box. In some embodiments, the fragmented search box may be determined such that the fragmented search box includes only undamaged portions of the characters. That is, in some embodiments, all damaged portions of the characters may be excluded from the fragmented search box.

Having determined the fragmented search region 1009 and applied any necessary image analysis, the character recognition system attempts to classify the characters using OCR. The classification is performed based only on the information within the fragmented search region 1009.

Figure 10C:
FIG. 10C is a binarized digital image having been processed by the circuit board processing system according to aspects of the present disclosure.
Figure 10D:
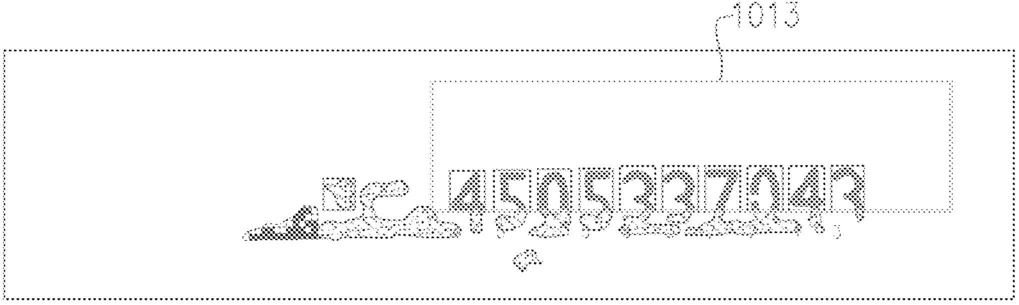
FIG. 10D is a binarized digital image having been processed using a fragmented search region by the circuit board processing system according to aspects of the present disclosure.

In some embodiments, image analysis includes applying local and/or global threshold values to binarize the digital image which may be applied in addition to the fragmented search region. FIGS. 10C and 10D illustrate digital images binarized by applying local threshold values according to embodiments previously described.

FIG. 10C illustrates such a digital image including a search box 1011 encompassing the entirety of the characters. FIG. 10D then illustrates the same digital image but having a fragmented search region 1013 applied to include only undamaged regions of the characters. The character recognition system may then successfully classify more of, or all of, the characters based on the binarized, fragmented search region 1013.

Figure 11A:
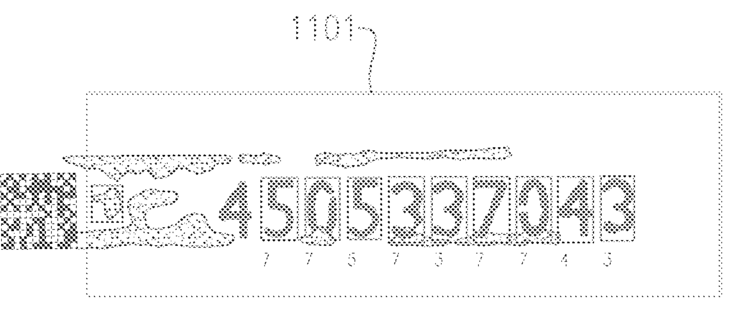
FIG. 11A is a binarized digital image having been processed by the circuit board processing system according to aspects of the present disclosure.
Figure 11B:
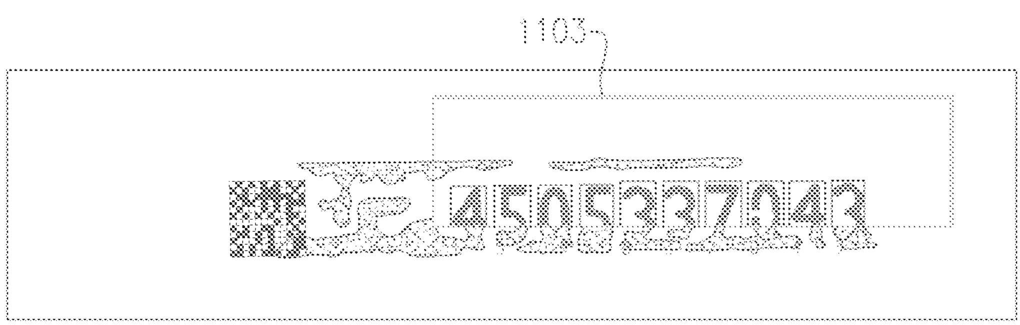
FIG. 11B is a binarized digital image having been processed using a fragmented search region by the circuit board processing system according to aspects of the present disclosure.

In some embodiments, if classification is unsuccessful, the character recognition system may iteratively apply global threshold values in the manner described previously in addition to applying the fragmented search box, and in addition or alternatively to applying local threshold values until the characters can be successfully classified. FIG. 11A illustrates a digital image binarized using global threshold values and including a search box 1101 encompassing the entirety of the characters. FIG. 11B then illustrates the same digital image but having a fragmented search region 1103 applied to include only undamaged regions of the characters.

The character recognition system may then successfully classify more of, or all of, the characters based on the fragmented search region 1103 binarized additional using iterative global threshold binarization according to embodiments described herein.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., a non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the scope of this disclosure. The teachings of the invention provided herein can be applied to other methods and systems, and are not limited to the methods and systems described above, and elements and acts of the various embodiments described above can be combined to provide further embodiments. Accordingly, the methods and systems described herein may be embodied in a variety of other forms; furthermore, various omissions, substitutions and changes in the form of the methods and systems described herein may be made without departing from the scope of the disclosure. The accompanying claims and their equivalents are intended to cover such forms or modifications as would fall within the scope of the disclosure.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting.

What is claimed is:

1. A circuit board processing system configured to process a panel, the system comprising a character recognition system configured to obtain a digital image of a character imprinted on a surface of the panel, the character recognition system being further configured to determine a fragmented search region based on an analysis of damage to the character;

apply the fragmented search region to the digital image, the fragmented search region excluding at least some of the damage to the character based on the analysis of damage to the character, to obtain less than a whole of the character, apply image analysis to the less than a whole of the character, and classify the character based on the image analysis.

2. The circuit board processing system of claim 1 wherein the image analysis includes applying a local threshold value to one or more localities of the digital image to provide a binarized image of the character, the local threshold value applied to each locality of the one or more localities being based on pixel information around each respective locality.

3. The circuit board processing system of claim 2 wherein the pixel information includes one or more pixel intensity values of neighboring pixels to a pixel of each respective locality.

4. The circuit board processing system of claim 1 wherein the image analysis further includes, after applying the local threshold values, applying contrast equalization to the digital image of the character.

5. The circuit board processing system of claim 1 wherein responsive to failing to classify the character based on the image analysis, the character recognition system is further configured to apply a global threshold value to the binarized digital image to provide a binarized digital image of the character.

6. The circuit board processing system of claim 5 wherein the character recognition system is further configured to iteratively apply global threshold values to provide a series of binarized digital images of the character, each iteration having a different global threshold value, until the character can be successfully classified.

7. The circuit board processing system of claim 1 wherein the image analysis includes applying local threshold values to a plurality of localities of the digital image to provide a binarized image of the entire character.

8. The circuit board processing system of claim 1 wherein the panel comprises an array of units that are joined together, each unit having a surface, the panel including a surface outside of the array of units.

9. The circuit board processing system of claim 8 wherein the character is imprinted on the surface of each unit.

10. A packaged module processing system comprising:

a circuit board processing system configured to process a panel having an array of units that are joined together;

a module processing system configured to produce a number of packaged modules from the array of units, such that each packaged module includes a surface; and a character recognition system configured to obtain a digital image of a character imprinted on a surface of the panel, the character recognition system being further configured to determine a fragmented search region based on an analysis of damage to the character;

apply the fragmented search region to the digital image, the fragmented search region excluding at least some of the damage to the character based on the analysis of damage to the character, to obtain less than a whole of the character, apply image analysis to the less than a whole of the character, and classify the character based on the image analysis.

11. A method for fabricating packaged modules, the method comprising:

forming or providing a panel having an array of units that are joined together, each unit including a surface, the panel including a surface outside of the array of units;

producing a number of packaged modules from the array of units, such that each packaged module includes a surface; and performing a character recognition process to obtain a digital image of a character imprinted on each of some or all of the surface of the panel, the surface of each unit, and the surface of each packaged module, the character recognition process including determining a fragmented search region based on an analysis of damage to the character; applying the fragmented search region to the digital image, the fragmented search region excluding at least some of the damage to the character based on the analysis of damage to the character, to obtain less than a whole of the character, applying image analysis to the less than a whole of the character, and classifying the character based on the image analysis.

12. The method for fabricating packaged modules of claim 11 wherein the image analysis includes applying a local threshold value to one or more localities of the digital image to provide a binarized image of the character, the local threshold value applied to each locality of the one or more localities being based on pixel information around each respective locality.

13. The method for fabricating packaged modules of claim 12 wherein the pixel information includes one or more pixel intensity values of neighboring pixels to a pixel of each respective locality.

14. The method for fabricating packaged modules of claim 11 wherein the image analysis further includes, after applying the local threshold values, applying contrast equalization to the digital image of the character.

15. The method for fabricating packaged modules of claim 11 wherein responsive to failing to classify the character based on the image analysis, the character recognition system is further configured to apply a global threshold value to the binarized digital image to provide a binarized digital image of the character.

16. The method for fabricating packaged modules of claim 15 wherein the character recognition system is further configured to iteratively apply global threshold values to provide a series of binarized digital images of the character, each iteration having a different global threshold value, until the character can be successfully classified.

* * * * *